United States Patent [19]
Affa

[11] Patent Number: 4,554,741
[45] Date of Patent: Nov. 26, 1985

[54] MEASURING SYSTEM

[75] Inventor: Alfred Affa, Stein, Fed. Rep. of Germany

[73] Assignee: Dr. Johannes Heidenhain GmbH, Traunreut, Fed. Rep. of Germany

[21] Appl. No.: 598,829

[22] Filed: Apr. 10, 1984

[30] Foreign Application Priority Data

May 3, 1983 [DE] Fed. Rep. of Germany ....... 3316082

[51] Int. Cl.[4] ............................................. G01B 11/04
[52] U.S. Cl. ................................. 33/125 C; 33/125 T; 250/237 G
[58] Field of Search ............. 33/125 A, 125 C, 125 T, 33/DIG. 19; 250/237 G

[56] References Cited

U.S. PATENT DOCUMENTS

| | | | |
|---|---|---|---|
| 3,533,703 | 10/1970 | Wingate | 250/237 G |
| 3,816,002 | 6/1974 | Wieg | 33/125 C |
| 4,060,903 | 12/1977 | Ernst | 33/125 C |
| 4,160,328 | 7/1979 | Ernst | 33/125 C |
| 4,170,826 | 10/1979 | Holstein | 33/125 T |

FOREIGN PATENT DOCUMENTS

| | | | |
|---|---|---|---|
| 3243966 | 5/1984 | Fed. Rep. of Germany | 33/125 T |
| 1050061 | 12/1966 | United Kingdom | 33/125 T |
| 591692 | 2/1978 | U.S.S.R. | 33/125 T |

*Primary Examiner*—Richard R. Stearns
*Attorney, Agent, or Firm*—Willian Brinks Olds Hofer Gilson & Lione Ltd.

[57] ABSTRACT

A measuring system for measuring the relative position of two machine parts of a processing machine includes a scale fastened at one end by means of screws to the slide of the machine. The other end of the scale is joined by means of an adhesive layer with one end of an expansion element. The other end of the expansion element is fastened in a similar manner by means of screws to the slide. For the compensation of thermally induced length changes of the scale, the expansion element is provided with a coefficient of thermal expansion substantially greater than that of the slide piece. Thermal expansion of the expansion element is dimensioned in such a way that the measuring length of the scale is preserved in an unaltered length in the event of temperature fluctuations by means of increased compressive forces applied by the expansion element to the scale.

12 Claims, 3 Drawing Figures

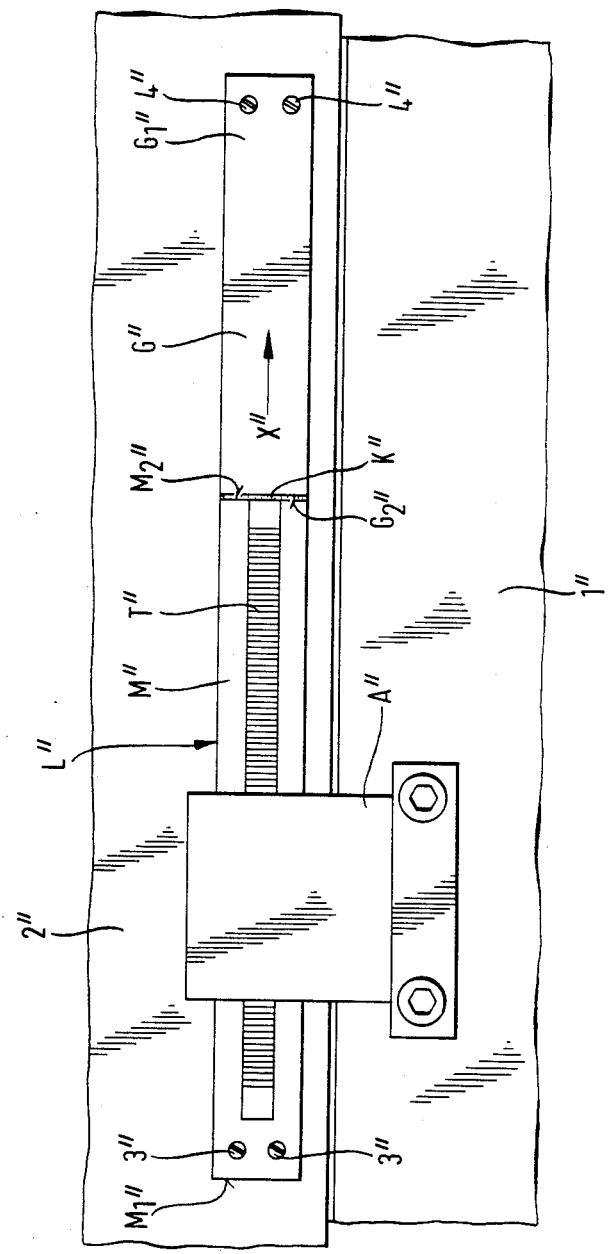

MEASURING SYSTEM

BACKGROUND OF THE INVENTION

The present invention relates to a measuring system for measuring the relative position of first and second objects, of the type comprising a scale which is secured to the first object, and a scanning unit which is secured to the second object to scan the scale.

When such measuring instruments are used in harsh environments such as those associated with many processing machines, the measuring system for measuring or adjusting the relative position between a tool and a workpiece must often be fastened to a machine part which, during the operation of the processing machine, heats severely with respect to the workpiece that is to be measured or processed. In this event, the scale of the measuring system is typically heated as well, and the scale expands, so that measuring errors can result. One prior art approach to overcoming such measuring error is to provide a scale of a material having a negligibly low coefficient of thermal expansion for such measuring systems. Such a scale can be formed of quartz glass or Invar. However, such a scale is relatively expensive to manufacture.

SUMMARY OF THE INVENTION

The present invention is directed to an improved measuring system of the type described above, in which measuring accuracy is preserved even in the event that a scale with a finite coefficient of thermal expansion is heated.

According to this invention, a measuring system of the type described initially above is provided with an expansion element having a first end coupled to the first object and a second end. This expansion element has a coefficient of thermal expansion which differs from that of the scale. Means are provided for coupling the second end of the expansion element to the second end of the scale such that the expansion element applies a force on the scale which varies as a function of temperature to maintain the measuring length of the scale substantially constant over a range of temperatures.

The present invention provides the important advantages that particularly simple means can be used to compensate for thermal length changes of a measuring scale. When the present invention is used, no particular material need be used to form the scale. In this way, a considerable reduction in the cost of the measuring system can be realized. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 3 is an elevational view of a length measuring system which incorporates a third preferred embodiment of this invention.

DETAILED DESCRIPTION OF THE PRESENTLY PREFERRED EMBODIMENTS

Figure 1:
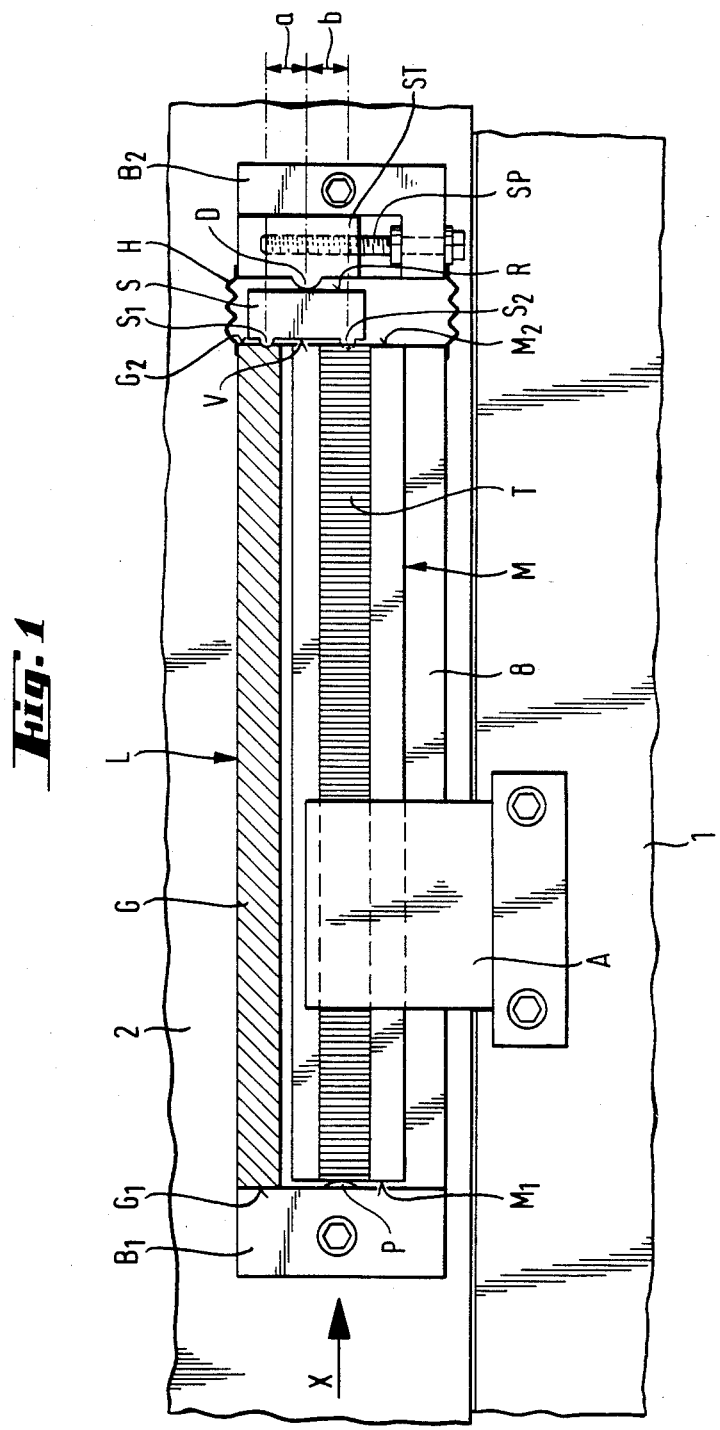
FIG. 1 is a longitudinal sectional view of a length measuring system which incorporates a first preferred embodiment of this invention.

Turning now to the drawings, FIG. 1 represents a portion of a machine tool which defines a machine bed 1. A slide 2 is guided for horizontal movement over the bed 1 in the X direction. For the measurement of the relative position of the slide 2 with respect to the bed 1, or between a tool and a workpiece (not shown), a length measuring system L is arranged on the slide 2.

This length measuring system L includes a scale carrier in the form of a housing G. In the interior of this housing G a scale M which defines a graduation T is mounted by means of an elastic adhesive layer (not shown). This elastic adhesive layer allows a certain shifting of the scale M in the X direction (the measuring direction) relative to the housing G. The housing G is fastened by means of two fastening elements $B_1$, $B_2$ to the slide 2. The housing G defines a longitudinal slit 8 which is closed by sealing elements (not shown). A scanning unit A is fastened to the machine bed 1 to scan the graduation T of the scale M in a manner known to the art. The scanning unit A protrudes through the slit 8, between the sealing elements (not shown), into the interior of the housing G. The details of the scanning unit A do not per se form part of this invention and are therefore not disclosed here in greater detail.

According to this invention, means are provided for compensating for thermally induced length changes of the scale M which result as a consequence of heating of the slide 2 with respect to the environmental temperature. Such heating of the slide 2 can be caused, for example, by the drive, gear, and bearing (not shown) of the slide 2. In this embodiment of the invention, the housing G is connected as an expansion element with one end $G_1$ directly in contact with the first fastening element $B_1$. The other end $G_2$ of the housing G bears on a rocker arm S. This rocker arm S is mounted to a second fastening element $B_2$, which is in turn mounted to the slide 2 of the machine tool. The rocker arm S also bears on an adjacent end $M_2$ of the scale M as shown in FIG. 1. The rocker arm S defines on a front side V two projections $S_1$, $S_2$ which engage corresponding recesses in the ends $G_2$, $M_2$ of the housing G and the scale M, respectively. The rocker arm S defines a flat rear surface R which bears against a projection D defined by an adjusting element ST. The projection D serves as a pivot point or axis for the rocker arm S. The fastening element $B_2$ is arranged on the slide 2 in such a way that the fastening element $B_2$ supports the adjusting element ST and the rocker arm S, and therefore the housing G and the scale M, free of play. The other end $M_1$ of the scale M is in contact with a stop P defined by the first fastening element $B_1$.

In the event the slide piece 2 is heated with respect to the temperature of the workpiece in operation of the machine tool, the housing G and the scale M experience the same temperature increase. In this embodiment, the housing G is formed for example of aluminum, and the slide 2 is formed of steel or cast steel for example. The coefficient of thermal expansion $\alpha_G$ of the housing G is therefore in this embodiment substantially greater than the coefficient of thermal expansion $\alpha_S$ of the slide 2. Thus, in the event of heating, the end $G_2$ of the housing G is shifted in a positive X direction (to the right as shown in FIG. 1) relative to the pivot point D of the fastening element $B_2$. As a consequence, the rocker arm S is pivoted about the projection D in a clockwise direction as shown in FIG. 1 to exert a compressive force on the scale M in a negative X direction against the stop P of the first fastening element $B_1$. It has been discovered that when the ratio of the lever arms of the rocker arm S with respect to the housing G and the scale M are properly proportioned, the original measurement length of the scale M is preserved throughout a range of temperatures by means of the variable compressive load exerted on the scale M between the rocker arm S and the projection P. In this embodiment, the correct ratio is given by the formula $a/b = (\alpha_G - \alpha_S)/\alpha_S$, where $\alpha_G$ is the coefficient of thermal expansion of the housing G acting as an expansion element, $\alpha_S$ is the coefficient of thermal expansion of the slide 2, a is the distance between the projection $S_1$ and the pivot point D measured perpendicularly to the X direction, and b is the distance of the projection $S_2$ from the pivot point D measured perpendicularly to the X direction.

In order to make it possible to use the length measuring system L on machine parts with differing coefficients of thermal expansion, the ratio a/b of the rocker arm S is adjustable by means of the adjusting element ST which defines the projection D and is slidable in a guide of the fastening element $B_2$ perpendicular to the measuring direction X by means of a spindle SP. A bellows H is arranged between the fastening element $B_2$ and the end $G_2$ of the housing G in order to encapsulate the measuring system L against dirt particles and other contamination.

Figure 2:
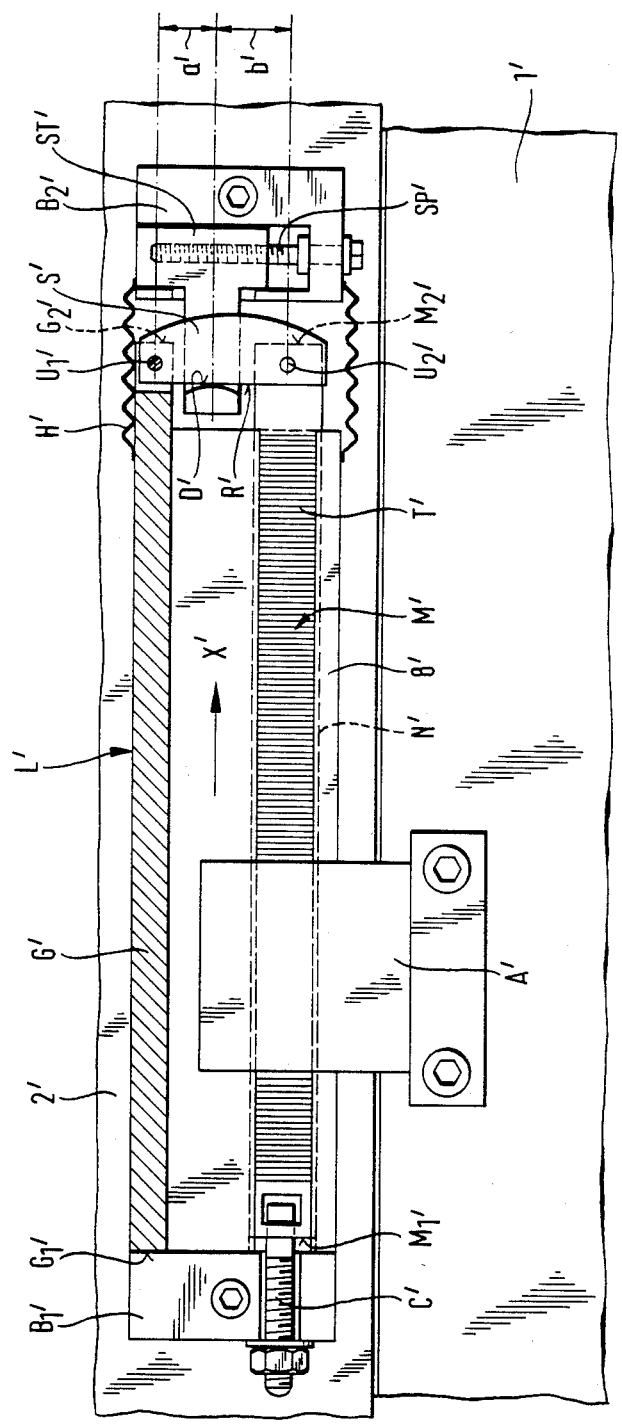
FIG. 2 is a longitudinal sectional view of a length measuring instrument which incorporates a second preferred embodiment of this invention.

FIG. 2 shows a machine tool on which is mounted a length measuring system L' which incorporates a second preferred embodiment of this invention. Similar elements of the system L' and the system L described above are referenced by the same reference symbols; however, the reference symbols of FIG. 2 include a prime.

The length measuring system L' includes a scale carrier in the form of a housing G', in the interior of which is mounted in a slidable manner a measuring band M' which defines graduation T'. The band M' is mounted in a groove N' so as to slide in the X' direction (the measuring direction) relative to the housing G'. The housing G' is fastened by means of two fastening elements $B_1'$, $B_2'$ to the slide 2' of the machine tool. This housing G' defines a longitudinal slit 8' sealed by sealing lips (not shown). A scanning unit A' is fastened to the machine bed 1' for scanning the graduation T' of the measuring band M'. This scanning unit A' extends through the longitudinal slit 8' and is sealed by the sealing lips (not shown).

In order to compensate for thermally induced length changes of the measuring band M' as a result of heating of the slide 2' with respect to the environmental temperature, the casing G' is used as an expansion element. The casing G' is connected with one end $G_1'$ directly abutting the first fastening element $B_1'$, and with the other end $G_2'$ mounted to a rocker arm S'. This rocker arm S' is mounted in the second fastening element $B_2'$. The adjacent ends $G_2'$, $M_2'$ of the casing G' and the measuring band M' are connected to the rocker arm S' by means of respective joints $U_1'$, $U_2'$. The rocker arm S' is arranged to define a flat back side R' facing the measuring band M'. An adjusting element ST' defines a projection D' which bears against this flat back side R' of the rocker arm S'. The adjusting element ST' is slidable in a guide defined by the fastening element $B_2'$ oriented perpendicularly to the measuring direction X' by means of a spindle SP'. The projection D' serves as a pivot point for the rocker arm S' and permits the adjustig element ST' to be shifted by means of the spindle SP' in order to adjust the ratio a'/b' of the rocker arm S'. The other end $M_1'$ of the measuring band M' is borne by means of a tensioning device in the form of a tension screw C' on the first fastening element $B_1'$. The fastening element $B_2'$ is arranged on the slide 2' in such a way that it is jointed free of play by means of the rocker arm S' with the housing G' and the measuring band M'. A bellows H' is mounted between the fastening element $B_2'$ and the end $G_2'$ of the housing G' in order to encapsulate the measuring system L' against contamination.

During the manufacturing process, the measuring band M' is made with a length shorter than that corresponding to its desired measuring length, i.e., the grid constant of the graduation T' is less than the correct, desired grid constant. This shortened measuring band M' is expanded in the length measuring system L' by means of the tension screw C' to the correct measuring length at the reference temperature, for example, the environmental of ambient temperature, or the temperature of the workpiece. When the slide 2' is heated with respect to the temperature of the workpiece during the operation of the machine tool, the housing G' and the measuring band M' undergo the same temperature rise. Since the housing G', however, has a substantially greater coefficient of thermal expansion than that of the slide 2', the end $G_2'$ of the housing G' shifts in a positive X' direction (to the right as shown in FIG. 2) relative to the pivot point D' of the adjusting element ST'. As a consequence, the rocker arm S' is pivoted and the measuring band M' experiences an "upsetting" or reduction in stretching forces in order to compensate for the thermally induced increases in length of the band M'. Through the swinging movement of the rocker arm S', the tension applied to stretch the measuring band M' is therefore reduced to such a dgree that the length change evoked by the temperature rise is cancelled out. In this way, the measuring band M' preserves the original desired measuring length, even in the event of temperature changes. The correct ratio for the rocker arm S' is given by the formula $a'/b' = (\alpha'_G - \alpha'_S)/\alpha'_S$, wherein $\alpha'_G$ is the coefficient of thermal expansion of the housing G' operating as an expansion element, $\alpha'_S$ represents the coefficient of thermal expansion of the slide 2', a' represents the distance between the joint $U_1'$ and the pivot point D' perpendicular to the X' axis, and b' represents the distance between the joint $U_2'$ and the pivot point D' perpendicular to the X' axis.

FIG. 3 represents a cutaway view of a machine tool on which is mounted a length measuring system L" which incorporates a third preferred embodiment of this invention. In FIG. 3, elements similar to those of FIG. 1 are identified with the same reference numeral, but doubly primed.

The length measuring system L" includes a scale M" which defines a graduation T" and is fastened at one end $M_1''$ by means of screws 3" to a slide 2". The other end $M_2''$ of the scale M" is joined by means of an adhesive layer K" with one end $G_2''$ of an expansion element G", the other end $G_1''$ of which is fastened by means of screws 4" to the slide 2". The graduation T" of the scale M" is scanned by a scanning unit A" fastened to the machine bed 1".

For the compensation of thermally induced length changes of the scale M", the expansion element G" is provided with a substantially higher coefficient of thermal expansion than that of the slide 2". The coefficient of thermal expansion of the expansion element G" is dimensioned in such a way that the measuring length of the scale M" is preserved in the event of temperature fluctuations by a corresponding upsetting resulting from increased compressive forces applied to the scale M" by the expansion element G". In a manner not shown, a plurality of expansion elements can be provided.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents which are intended to define the scope of this invention.

I claim:

1. In a measuring system for measuring the relative position of first and second objects, of the type comprising a scale which is secured to the first object and which defines first and second ends, and a scanning unit which is secured to the second object to scan the scale, the improvement comprising:

an expansion element having a first end coupled to the first object and a second end, said expansion element having a coefficient of thermal expansion which differs from that of the first object;

means for coupling the second end of the expansion element to the second end of the scale such that the expansion element applies a force on the scale which varies as function of temperature to maintain the measuring length of the scale substantially constant over a range of temperatures.

2. The invention of claim 1 wherein the measuring system further comprises first and second fastening elements mounted to the first object and a rocker arm positioned on the second fastening element to pivot about a pivot axis; wherein the scale is mounted on the expansion element so as to be shiftable in a measuring direction X; wherein the first end of the expansion element bears on the first fastening element and the second end of the expansion element bears on the rocker arm at a first distance a from the pivot axis, wherein the first end of the scale bears on the first fastening element and the second end of the scale bears on the rocker arm at a second distance b from the pivot axis; and wherein the ratio a/b is selected to maintain the measuring length of the scale substantially constant over a range of temperatures.

3. The invention of claim 2 wherein the first end of the scale is mounted to the first fastening element by means of a tensioning device.

4. The invention of claim 3 wherein the tensioning device comprises a tensioning screw.

5. The invention of claim 2 wherein the ratio a/b is equal to $(\alpha_G - \alpha_S)/\alpha_S$, represents the coefficient of thermal expansion of the expansion element and $\alpha_S$ represents the coefficient of thermal expansion of the first object.

6. The invention of claim 2 further comprising means for adjusting the ratio a/b of the rocker arm.

7. The invention of claim 6 wherein the rocker arm defines a flat surface facing the second fastening element; wherein the adjusting means comprises an adjusting element that defines a profection that bears on the flat surface of the rocker arm to define the pivot axis, and a spindle that supports the adjusting element on the second fastening element and adjusts the position of the adjusting element perpendicularly to the measuring direction X in order to adjust the ratio a/b.

8. The invention of claim 1 wherein the coupling means mounts the second end of the expansion element to abut the second end of the scale such that the expansion element extends along a meauring direction defined by the scale.

9. The invention of claim 1 wherein the measuring system further comprises first and second fastening elements mounted to the first object and a rocker arm positioned on the second fastening element to pivot about a pivot axis, wherein the first end of the expansion element bears on the first fastening element and the second end of the expansion element bears on the rocker arm at a first distance a from the pivot axis; wherein the first end of the scale bears on the first fastening element and the second end of the scale bears on the rocker arm at a second distance b from the pivot axis; and wherein the ratio a/b is selected to maintain the measuring length substantially constant over a range of temperatures.

10. The invention of claim 9 wherein the ratio a/b is equal to $(\alpha_G - \alpha_S)/\alpha_S$, where $\alpha_G$ represents the coefficient of thermal expansion of the expansion element and $\alpha_S$ represents the coefficient of thermal expansion of the first object.

11. The invention of claim 9 further comprising means for adjusting the ratio a/b of the rocker arm.

12. The invention of claim 11 wherein the rocker arm defines a flat surface facing the second fastening element; wherein the adjusting means comprises an adjusting element that defines a projection that bears on the flat surface of the rocker arm to define the pivot axis, and a spindle that supports the adjusting element on the second fastening element and adjusts the position of the adjusting element perpendicularly to the measuring direction X in order to adjust the ratio a/b.

* * * * *

UNITED STATES PATENT AND TRADEMARK OFFICE
CERTIFICATE OF CORRECTION

PATENT NO. : 4,554,741
DATED : November 26, 1985
INVENTOR(S) : Alfred Affa

It is certified that error appears in the above-identified patent and that said Letters Patent is hereby corrected as shown below:

<u>IN THE CLAIMS</u>

In Claim 5 (column 6, line 4), please insert --where $a_G$-- before the word "represents";

In Claim 8 (column 6, line 22), please delete "meauring" and substitute therefor --measuring--;

In Claim 9 (column 6, line 28), please delete "axis," and substitute therefor --axis;--.

Signed and Sealed this

Tenth Day of May, 1988

*Attest:*

DONALD J. QUIGG

*Attesting Officer*   Commissioner of Patents and Trademarks